US012652195B2

(12) United States Patent　　　(10) Patent No.:　US 12,652,195 B2
Enescu et al.　　　　　　　　　　(45) Date of Patent:　　Jun. 9, 2026

(54) CHANNEL PREDICTION ERROR DETERMINATION AND RELATED TRANSMISSION OF REFERENCE SIGNALS

(71) Applicant: Nokia Technologies Oy, Espoo (FI)

(72) Inventors: Mihai Enescu, Espoo (FI); Sami-Jukka Hakola, Oulu (FI); Juha Pekka Karjalainen, Oulu (FI); Timo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 294 days.

(21) Appl. No.: 18/562,673

(22) PCT Filed: Jun. 15, 2021

(86) PCT No.: PCT/EP2021/066034
§ 371 (c)(1),
(2) Date: Nov. 20, 2023

(87) PCT Pub. No.: WO2022/262945
PCT Pub. Date: Dec. 22, 2022

(65) Prior Publication Data
US 2024/0235898 A1　　Jul. 11, 2024

(51) Int. Cl.
H04L 25/02　　　(2006.01)
(52) U.S. Cl.
CPC ...... H04L 25/0224 (2013.01); H04L 25/0254 (2013.01)

(58) Field of Classification Search
CPC ........................ H04L 25/0224; H04L 25/0254
See application file for complete search history.

(56) References Cited

U.S. PATENT DOCUMENTS

| | | | |
|---|---|---|---|
| 10,419,181 B2 | 9/2019 | Xia et al. | |
| 10,856,280 B2 | 12/2020 | Noh et al. | |
| 2012/0106596 A1 | 5/2012 | Nguyen | |
| 2013/0094388 A1* | 4/2013 | Furuskar | H04B 17/309 |
| | | | 370/252 |
| 2017/0230780 A1* | 8/2017 | Chincholi | H04L 1/0036 |
| 2018/0287925 A1* | 10/2018 | Wik | H04L 41/064 |
| 2020/0136700 A1 | 4/2020 | Bogale et al. | |
| 2020/0177358 A1 | 6/2020 | Liu et al. | |
| 2020/0351053 A1 | 11/2020 | Werner et al. | |
| 2021/0050890 A1 | 2/2021 | Park et al. | |

(Continued)

OTHER PUBLICATIONS

"3rd Generation Partnership Project; Technical Specification Group Radio Access Network; NR; Physical layer procedures for control (Release 16)", 3GPP TS 38.213, V16.4.0, Dec. 2020, pp. 1-181.

(Continued)

*Primary Examiner* — Natasha W Cosme
(74) *Attorney, Agent, or Firm* — Carter, DeLuca & Farrell LLP

(57) ABSTRACT
Disclosed is a method comprising receiving a first reference signal transmission associated with a radio channel, predicting future conditions of the radio channel based at least partly on the first reference signal transmission, receiving one or more verification tones associated with the radio channel, and determining, based at least partly on the one or more verification tones, an estimation error associated with the predicted future conditions of the radio channel.

14 Claims, 19 Drawing Sheets

(56)     References Cited

U.S. PATENT DOCUMENTS

| 2021/0067297 A1 | 3/2021 | Farmanbar et al. |
| 2021/0111845 A1* | 4/2021 | Bae ................... H04W 72/1273 |
| 2022/0216938 A1* | 7/2022 | Pezeshki .............. H04L 5/0016 |
| 2023/0171023 A1* | 6/2023 | Gonzalez Gonzalez ................... H04B 17/13 370/252 |

OTHER PUBLICATIONS

"3rd Generation Partnership Project; Technical Specification Group Radio Access Network; NR; Physical layer procedures for data (Release 16)", 3GPP TS 38.214, V16.4.0, Dec. 2020, pp. 1-169.
"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
Enescu, "5G New Radio: A Beam-based Air Interface", John Wiley & Sons Ltd, 2020, 35 pages.
"PDSCH and PUSCH enhancements for 52.6-71GHz band", 3GPP TSG-RAN WG1 #104-e, R1-2101457, Agenda: 8.2.5, Qualcomm Incorporated, Jan. 25-Feb. 5, 2021, pp. 1-11.
"Reply on LS on PUCCH and PUSCH repetition", 3GPP TSG RAN WG1 #104bis-e, R1-2102298, RAN4, Apr. 12-20, 2021, 2 pages.
"Feature lead summary #2 on support of Type A PUSCH repetitions for Msg3", 3GPP TSG RAN WG1 #104b-e, R1-2104101, Agenda: 8.8.3, ZTE Corporation, Apr. 12-20, 2021, pp. 1-80.
"[104-e-NR-CovEnh-03] Summary of email discussion on joint channel estimation for PUSCH", 3GPP TSG RAN WG1 Meeting #104-e, R1-2102161, Agenda: 8.8.1.3, China Telecom, Jan. 25-Feb. 5, 2021, 92 pages.

"Discussion on Joint channel estimation for PUSCH", 3GPP TSG RAN WG1 Meeting #104bis-e, R1-2102313, Agenda: 8.8.1.3, Huawei, Apr. 12-20, 2021, 8 pages.
"Consideration on Joint channel estimation for PUSCH", 3GPP TSG RAN WG1 #104b-e, R1-2102409, Agenda: 8.8.1.3, OPPO, Apr. 12-20, 2021, 9 pages.
"Consideration on joint channel estimation over multi-PUSCH", 3GPP TSG RAN WG1 #104b-e, R1-2102465, Agenda: 8.8.1.3, Spreadtrum Communications, Apr. 12-20, 2021, 4 pages.
"Discussion on joint channel estimation for PUSCH", 3GPP TSG RAN WG1 #104b-e, R1-2102499, Agenda: 8.8.1.3, ZTE Corporation, Apr. 12-20, 2021, pp. 1-9.
"Discussion on Joint channel estimation for PUSCH", 3GPP TSG RAN WG1 #104b-e, R1-2102536, Agenda: 8.8.1.3, vivo, Apr. 12-20, 2021, pp. 1-13.
"Discussion on joint channel estimation for PUSCH", 3GPP TSG RAN WG1 Meeting #104b-e, R1-2102645, Agenda: 8.8.1.3, CATT, Apr. 12-20, 2021, 5 pages.
"Joint channel estimation for PUSCH coverage enhancements", 3GPP TSG RAN WG1 #104-bis-e, R1-2103382, Agenda: 8.8.1.3, Nokia, Apr. 12-20, 2021, 7 pages.
"Joint channel estimation for PUSCH", 3GPP TSG-RAN WG1 Meeting #104b-e, R1-2103180, Agenda: 8.8.1.3, Qualcomm Incorporated, Apr. 12-20, 2021, 8 pages.
Moon et al., "DMRS-Applied Repetition Transmission (DART): Grant-Free Scheme for mMTC", IEEE 3rd 5G World Forum (5GWF), Sep. 10-12, 2020, pp. 286-290.
Invitation to Pay Additional Fees received for corresponding Patent Cooperation Treaty Application No. PCT/EP2021/066034, dated Feb. 22, 2022, 9 pages.
International Search Report and Written Opinion received for corresponding Patent Cooperation Treaty Application No. PCT/EP2021/066034, dated Apr. 12, 2022, 17 pages.

* cited by examiner

D: DL slot,
S: special slot,
U: UL slot

DL control ▮ PDCCH

UL control ▮ PUCCH

DM-RS

1101 — Receive first reference signal transmission

1102 — Predict radio channel

1103 — Receive one or more verification tones

1104 — Determine estimation error

1501   Check for recovery reference signal transmission

1502   Detect recovery reference signal transmission

1800

1900

CHANNEL PREDICTION ERROR DETERMINATION AND RELATED TRANSMISSION OF REFERENCE SIGNALS

RELATED APPLICATION

This application was originally filed as PCT Application No. PCT/EP2021/066034, filed on Jun. 15, 2021, which is incorporated herein by reference in its entirety.

FIELD

The following exemplary embodiments relate to wireless communication.

BACKGROUND

As resources are limited, it is desirable to optimize the usage of network resources. A terminal device and/or a cell in a cellular communication network may be utilized to enable better usage of resources.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: receive a first reference signal transmission associated with a radio channel; predict future conditions of the radio channel based at least partly on the first reference signal transmission; receive one or more verification tones associated with the radio channel; and determine, based at least partly on the one or more verification tones, an estimation error associated with the predicted future conditions of the radio channel.

According to another aspect, there is provided an apparatus comprising means for: receiving a first reference signal transmission associated with a radio channel; predicting future conditions of the radio channel based at least partly on the first reference signal transmission; receiving one or more verification tones associated with the radio channel; and determining, based at least partly on the one or more verification tones, an estimation error associated with the predicted future conditions of the radio channel.

According to another aspect, there is provided a method comprising: receiving a first reference signal transmission associated with a radio channel; predicting future conditions of the radio channel based at least partly on the first reference signal transmission; receiving one or more verification tones associated with the radio channel; and determining, based at least partly on the one or more verification tones, an estimation error associated with the predicted future conditions of the radio channel.

According to another aspect, there is provided a computer program comprising instructions for causing an apparatus to perform at least the following: receive a first reference signal transmission associated with a radio channel; predict future conditions of the radio channel based at least partly on the first reference signal transmission; receive one or more verification tones associated with the radio channel; and determine, based at least partly on the one or more verification tones, an estimation error associated with the predicted future conditions of the radio channel.

According to another aspect, there is provided a computer readable medium comprising program instructions for causing an apparatus to perform at least the following: receive a first reference signal transmission associated with a radio channel; predict future conditions of the radio channel based at least partly on the first reference signal transmission; receive one or more verification tones associated with the radio channel; and determine, based at least partly on the one or more verification tones, an estimation error associated with the predicted future conditions of the radio channel.

According to another aspect, there is provided a non-transitory computer readable medium comprising program instructions for causing an apparatus to perform at least the following: receive a first reference signal transmission associated with a radio channel; predict future conditions of the radio channel based at least partly on the first reference signal transmission; receive one or more verification tones associated with the radio channel; and determine, based at least partly on the one or more verification tones, an estimation error associated with the predicted future conditions of the radio channel.

According to another aspect, there is provided a system comprising at least a first apparatus and a second apparatus. The first apparatus is configured to: receive, from the second apparatus, a first reference signal transmission associated with a radio channel; predict future conditions of the radio channel based at least partly on the first reference signal transmission; receive, from the second apparatus, one or more verification tones associated with the radio channel; and determine, based at least partly on the one or more verification tones, an estimation error associated with the predicted future conditions of the radio channel. The second apparatus is configured to: transmit the first reference signal transmission to the first apparatus; and transmit the one or more verification tones to the first apparatus.

According to another aspect, there is provided a system comprising at least a first apparatus and a second apparatus. The first apparatus comprises means for: receiving, from the second apparatus, a first reference signal transmission associated with a radio channel; predicting future conditions of the radio channel based at least partly on the first reference signal transmission; receiving, from the second apparatus, one or more verification tones associated with the radio channel; and determining, based at least partly on the one or more verification tones, an estimation error associated with the predicted future conditions of the radio channel. The second apparatus comprises means for: transmitting the first reference signal transmission to the first apparatus; and transmitting the one or more verification tones to the first apparatus.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
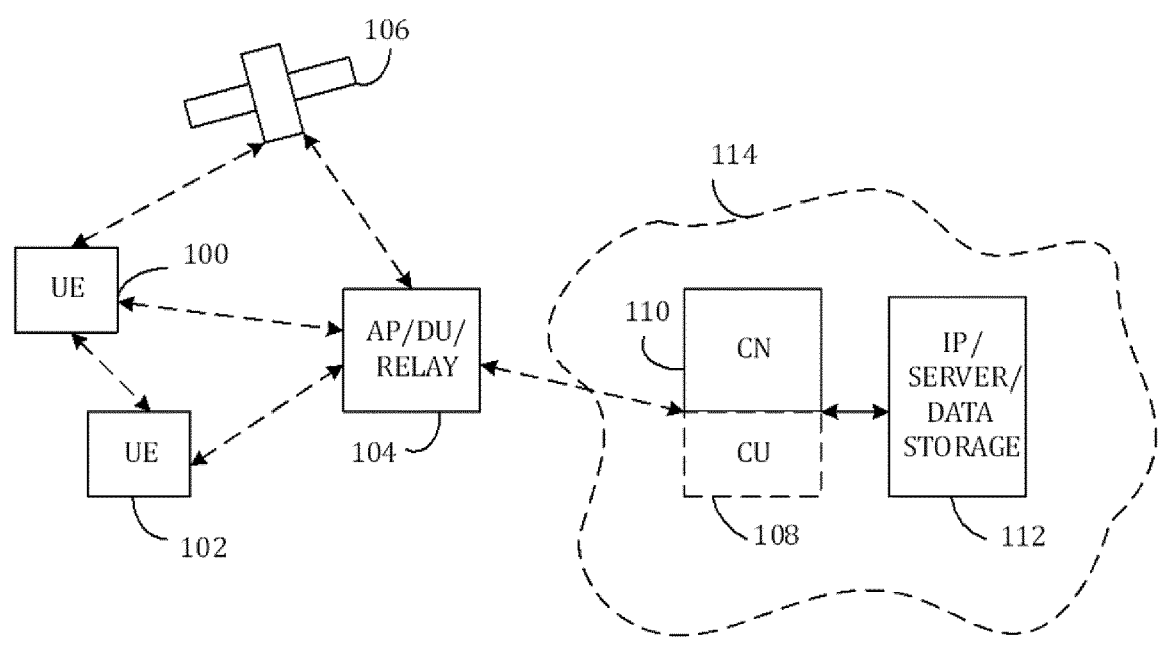
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The (e/g)NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e. link(s) between IAB node and a donor node, also known as a parent node) and a distributed unit (DU) part, which takes care of the access link(s), i.e. child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloud-RAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular megaconstellations (systems in which hundreds of (nano)satellites are deployed). At least one satellite 106 in the megaconstellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU. The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

In wireless communication systems, information may be transmitted via a radio channel. The effect of the channel on the transmitted signal may need to be estimated in order to recover the transmitted data. For example, with binary phase shift keying (BPSK), binary information is represented as +1 and −1 symbol values. The radio channel may apply a phase shift to the transmitted symbols, possibly inverting the symbol values. As long as the receiver can estimate what the channel did to the transmitted signal, it can accurately recover the data comprised in the signal.

Reference signals, which may also be referred to as pilots, may be transmitted along with the data in order to obtain channel knowledge for proper decoding of received signals. Reference signals are pre-defined signals that are known at both the transmitter and receiver. Thus, the receiver can estimate the effect of the channel by comparing the received reference signal with the original reference signal known at the receiver.

Reference signals may be used in both downlink and uplink for example for obtaining an accurate channel in order to derive channel state information (CSI), to demodulate data, and/or to allow the receiver to perform fine time and frequency channel tracking. Even if the specified reference signals were done with overhead in mind, and also with a tradeoff for estimation quality, they may occupy a large amount of resources, for example when the scenarios are more dynamic from the UE velocity point-of-view, and hence estimation quality may be more difficult to achieve.

Machine learning (ML) and/or other artificial intelligence (AI) algorithms may be applied in various areas of a communication system, for example for MIMO areas such as beam management, predictable mobility, CSI acquisition, as well as in other physical (PHY) domains such as positioning, reference signals, and/or resource allocation.

Figure 2:
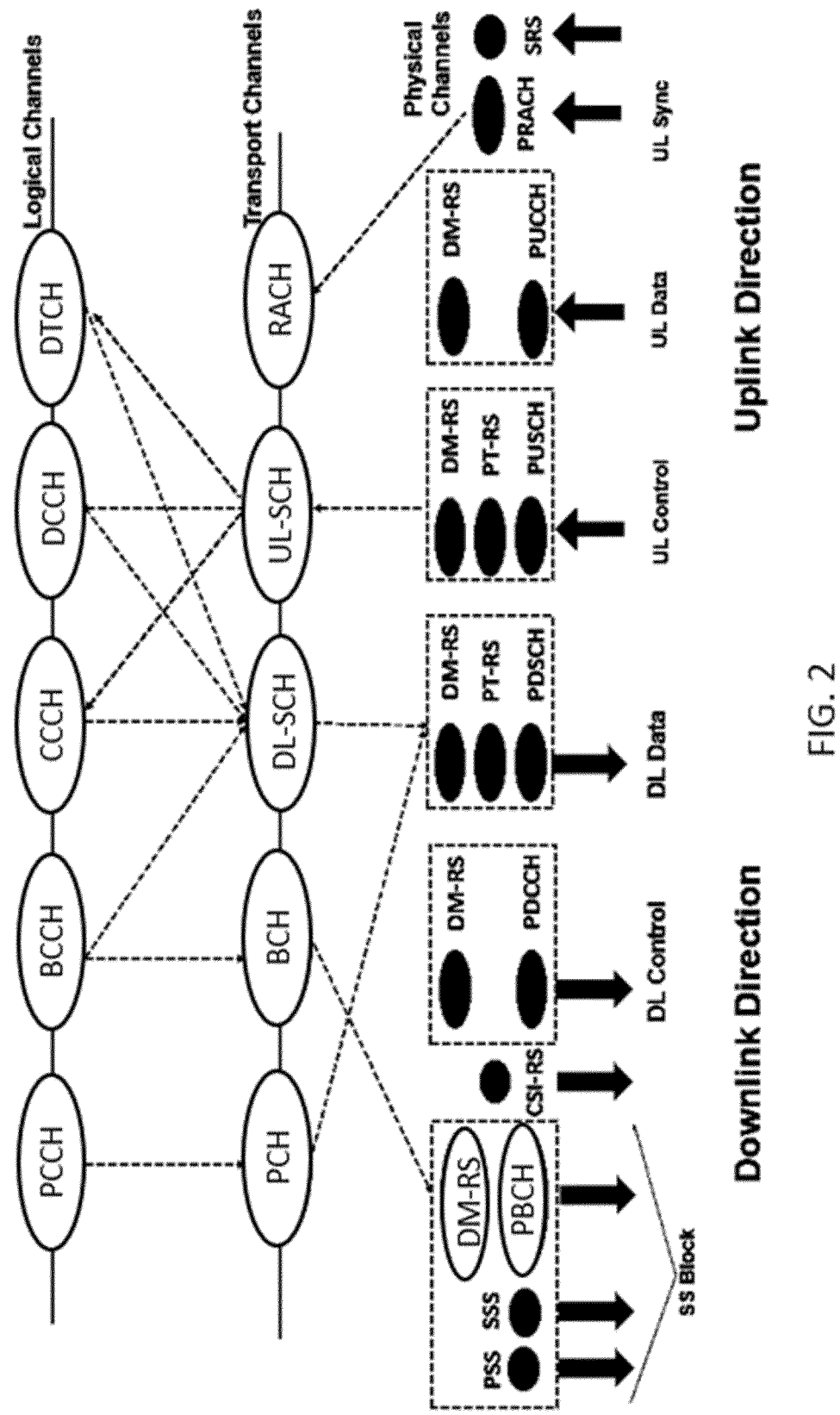
FIG. 2 illustrates a mapping of reference signals to different physical channels.

For example, the following five reference signals may be used in NR: demodulation reference signal (DM-RS), phase tracking reference signal (PT-RS), sounding reference signal (SRS), channel state information reference signal (CSI-RS), and synchronization signal block (SSB). FIG. 2 illustrates a mapping of these reference signals to different physical channels.

DM-RS may be used by a receiver to estimate the radio channel for demodulation of the associated physical channel. DM-RS design and mapping may be specific to a given downlink (DL) or uplink (UL) NR channel, such as a physical broadcast channel (PBCH), physical downlink control channel (PDCCH), physical downlink shared channel (PDSCH), physical uplink control channel (PUCCH), or physical uplink shared channel (PUSCH). DM-RS may be specific for a specific UE, and transmitted on demand. The system can beamform the DM-RS, keep it within a scheduled resource, and transmit it when necessary in either downlink or uplink. Additionally, multiple orthogonal DM-RSs can be allocated to support MIMO transmission. The network may present UEs with DM-RS information early on for the initial decoding requirement that low-latency applications may need, but it may only occasionally present this information for low-speed scenarios, in which the channel shows little change. In high-mobility scenarios to track fast changes in the channel, it may increase the rate of transmission of the DM-RS signal (called "additional DM-RS").

PT-RS may be used to track the phase of the local oscillator at the transmitter and/or receiver. The phase noise of a transmitter increases as the frequency of operation increases. One of the main problems that phase noise introduces into an orthogonal frequency-division multiplexing (OFDM) signal appears as a common phase rotation of the sub-carriers, known as the common phase error (CPE). PT-RS enables suppression of phase noise and CPE for example at higher mmWave frequencies. PT-RS may be present both in the uplink (PUSCH) and downlink (PDSCH) data channels. The presence as well as the time and frequency domain density of the PT-RS is a function of the modulation and coding scheme (MCS), and the allocation bandwidth of the PUSCH and PDSCH. Due to phase noise properties, PT-RS has a low density in the frequency domain and a high density in the time domain. The density in the frequency domain is a function of the allocation bandwidth, and the density in the time domain is a function of the MCS. PT-RS may be associated with one DM-RS port during transmission. Moreover, PT-RS may be confined to the scheduled bandwidth and the duration used for PDSCH and PUSCH. The system may map the PT-RS information to a few subcarriers per symbol, because the phase rotation affects the sub-carriers with an OFDM symbol equally, but shows low correlation from symbol to symbol.

SRS is an uplink signal that may be transmitted by a UE to help a gNB obtain the CSI for the UE. CSI describes how the signal propagates from the UE to the gNB, and it represents the combined effect of scattering, fading, and power decay with distance. The system may use the SRS for resource scheduling, link adaptation, massive MIMO, and/or beam management. The SRS may be configured specific to a given UE. In the time domain, SRS may span 1, 2 or 4 consecutive symbols, which may be mapped within the last six symbols of the slot. Multiple SRS symbols allow coverage extension and increased sounding capacity.

CSI-RS is a downlink signal. The CSI-RS that a UE receives is used to estimate the channel and report channel quality information back to the gNB. For example, the CSI-RS may be used for reference signal received power (RSRP) measurements during mobility and beam management. CSI-RS may also be used for frequency and/or time tracking, demodulation, and UL reciprocity-based pre-coding. CSI-RS may be configured specific to a given UE, but multiple UEs may also share the same resource. 5G NR allows a high level of flexibility in CSI-RS configurations, and a resource can be configured with up to 32 ports, for example. A CSI-RS resource may start at any OFDM symbol of the slot and it may occupy, for example, 1, 2 or 4 OFDM symbols depending on the configured number of ports. CSI-RS may be periodic, semi-persistent, or aperiodic due to downlink control information (DCI) triggering. For time and/or frequency tracking, CSI-RS can be periodic or aperiodic. It may be transmitted in bursts of two or four symbols, which may be spread across one or two slots. The time and/or frequency tracking CSI-RS may also be called a tracking reference signal (TRS). During MIMO operations, NR may use different antenna approaches based on the carrier frequency. At lower frequencies, the system may use a modest number of active antennas for multi-user MIMO (MU-MIMO) and adds frequency-division duplexing (FDD) operations. In this case, the UE may use the CSI-RS to calculate the CSI and report it back in the uplink direction.

SSB may be used for beam management. To enable a UE to find a cell while entering a system, as well as to find new cells when moving within the system, a synchronization signal comprising a primary synchronization signal (PSS) and a secondary synchronization signal (SSS) may be periodically transmitted on the downlink from a given NR cell. Thus, the PSS and SSS along with PBCH can be jointly referred to as the SSB. The synchronization is a process, in which the UE obtains the time and frequency information of the wireless network in order for the UE to access the network.

Figure 3:
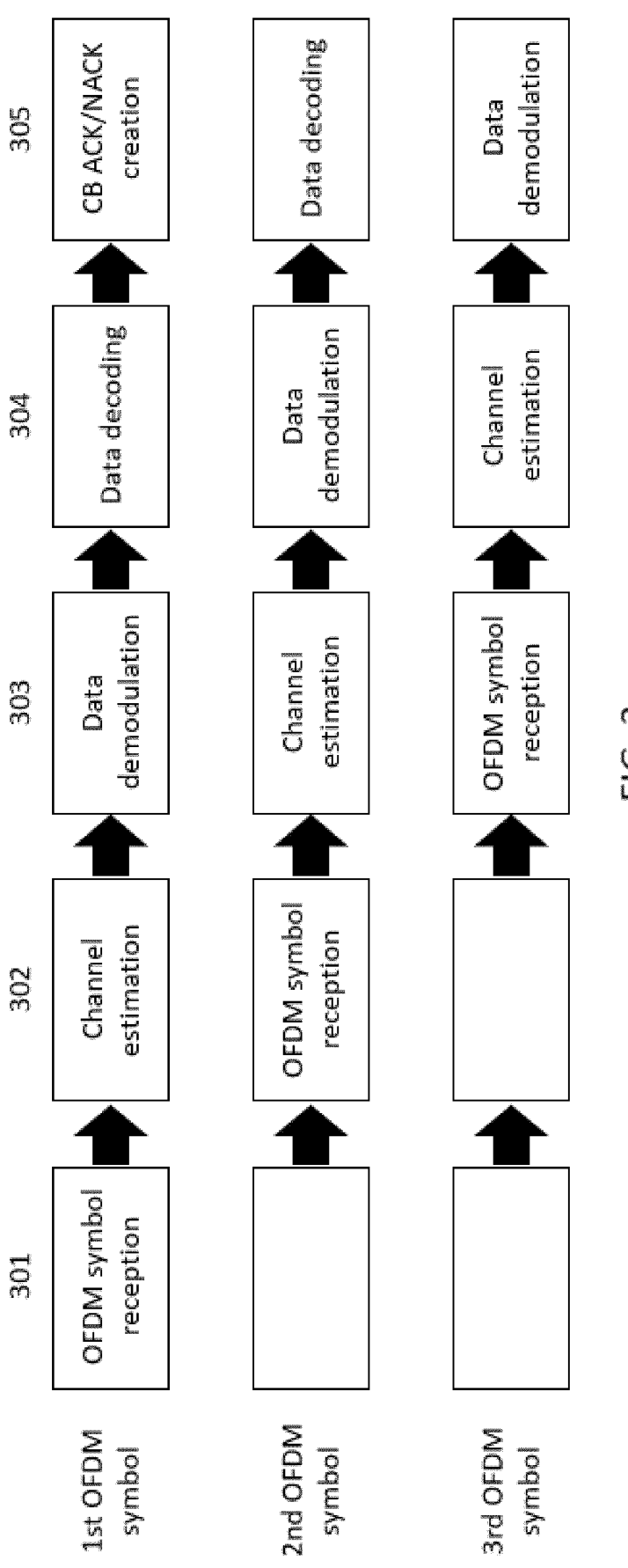
FIG. 3 illustrates pipeline processing.

FIG. 3 illustrates pipeline processing enabled by a front-loaded DM-RS pattern. Placing training pilots toward the beginning of the data region allows a UE to acquire a channel estimate as soon as the first few symbols arrive, without having to buffer the full package, and thus start the data demodulation and decoding soon after that. A front-loaded DM-RS pattern facilitates what is also known as "pipeline processing" of the main processing blocks at a receiver: OFDM symbol reception 301, channel estimation 302, data demodulation 303, data decoding 304, and creation 305 of an acknowledgment (ACK) or negative acknowledgement (NACK), without having to receive and store all the packages. It should be noted that some aspects in NR may need to be tailored to facilitate such processing, for example frequency-first mapping of the encoded data on the time-frequency resources or single-codeword for up to rank 4 PDSCH or PUSCH transmissions.

An advantage of the pipeline processing is that, in a fairly short amount of time (5 OFDM symbols duration in the example of FIG. 3), the UE is able to generate code blocks of ACKs or NACKs. Hence, when the last symbol from the allocation is received, the UE is able to have an ACK or NACK for the transport block and is ready to report that to the gNB, not needing extra processing time (see FIG. 4). In other words, the data and its ACK or NACK are available in the same slot.

An ACK may be sent if the UE has successfully received and decoded a transmission. On the other hand, a NACK may be sent if the UE fails in decoding the transmission. In response to receiving a NACK, the gNB may send a retransmission to give the receiving UEs another opportunity to receive the corresponding transport block.

Figure 4:
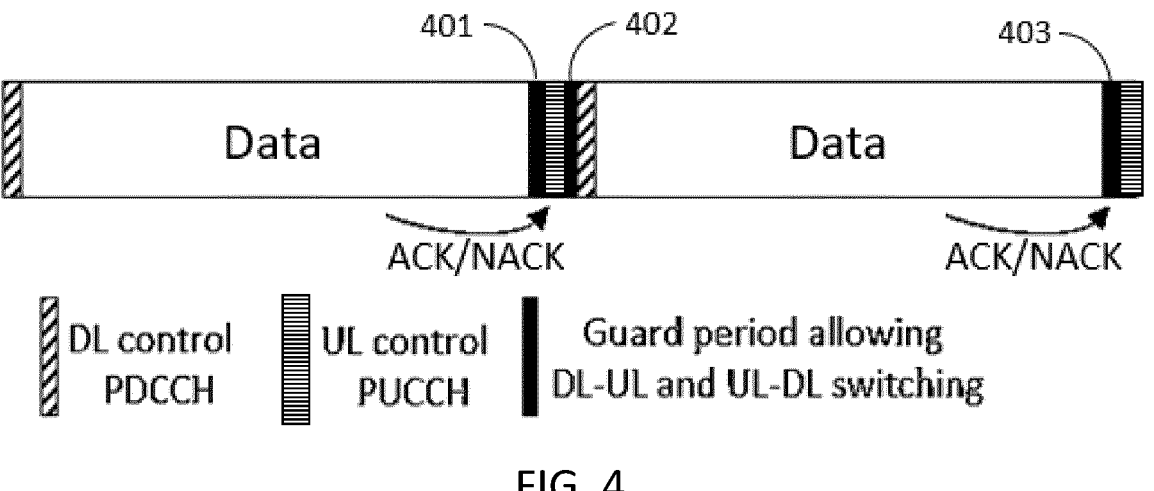
FIG. 4 illustrates an example of time-division duplexing downlink for a self-contained slot operation.

FIG. 4 illustrates an example of time-division duplexing (TDD) downlink for a self-contained slot operation. In FIG. 4, the DL-UL and UL-DL guard periods 401, 402, 403 are also depicted, which may be needed to cover for the radio frequency (RF) switching time, as well as the UE and gNB processing time. This kind of processing may also happen during the cyclic prefix (CP) duration, in which case no additional guard intervals may be needed.

Neural network (NN) solutions for PHY may be based on some form of training or learning for a NN algorithm, which may placed at either or both ends of the communication. Herein a neural network refers to an artificial neural network. For example, the gNB may learn the medium and construct a NN model, or parameterization, which is transferred to the UE to assist the UE with channel estimation. The reverse process may also be used, as well as a situation where both the gNB and the UE are part of the NN algorithms in a form of iterative operation and/or learning. Once the NN model is constructed, radio signaling may occur between the gNB and the UE. Such operation may be performed with less signaling compared to legacy systems, relying on the learning performed by the NN algorithm.

There is a challenge in how to enable facilitating ML/AI algorithms and functionalities in the transmission and reception of reference signals for example in NR systems and beyond. One of the goals of such ML/AI solutions may be to reduce signaling compared to legacy systems, while achieving equal or improved performance. In high mobility (i.e. high speed) situations, it may become impractical to perform reference signal transmission and signaling according to legacy techniques, and hence prediction-based ML/AI techniques may be more beneficial instead. A similar situation may also happen in static channel conditions, where unnecessary transmission of reference signals may be avoided by utilizing prediction-based ML/AI techniques at the gNB and/or UE. The framework in which such ML/AI solutions operate may need to have some degree of robustness as in the case when legacy signaling would have been applied. It should be noted that at least in a transitory period from environments learned by the NN, the UE needs to remain in an operating mode.

In low-speed scenarios, the channel conditions, or statistics, may remain similar over time, and hence the reference signal transmission per slot may not necessarily be needed. In addition, unchanging channel conditions may be more appealing for prediction algorithms. DM-RS could be utilized less often, as well as CSI-RS and SRS.

In high-speed scenarios, channel conditions are more dynamic and legacy transmission requires a higher DM-RS overhead. On the other hand, the channel feedback turn-around time may become problematic, as channel aging has a large impact on how valid the estimated parameters are over time. It becomes impractical to increase the reference signal overhead, as this rapidly decreases the system efficiency. Additional aids of velocity estimation and awareness at both the gNB and UE may allow for trajectory prediction, which maps into DM-RS channel prediction and even CSI-RS-less transmission, as open loop schemes or AI-enabled (semi) closed-loop schemes may be more appealing.

Reference signal transmission overhead may be reduced by allowing operation with different reference signal densities in different transmissions slots. However, the current transmission framework is constructed around time units (slots or subframes), which mandate a certain degree of reference signal transmission (DM-RS, CSI-RS, TRS, SRS). Also, data is allocated such that it matches the transmission framework, thus interacting with rate matching, etc.

It may also be possible to reduce DM-RS overhead by skipping the DM-RS transmissions for some of the granted PDSCH and/or PUSCH allocations, when the remaining DM-RS symbols in the bundle are sufficient to achieve the required channel estimation performance. This may lead to some gains in the overall throughput from the saved overhead. With a smaller number of DM-RS symbols, it may be beneficial to introduce new reference signals to track and estimate the bursty interference. The new signals can be used for interference covariance estimation to enhance the demodulation performance, with less overhead compared with the saved DM-RS overhead.

Figure 5:
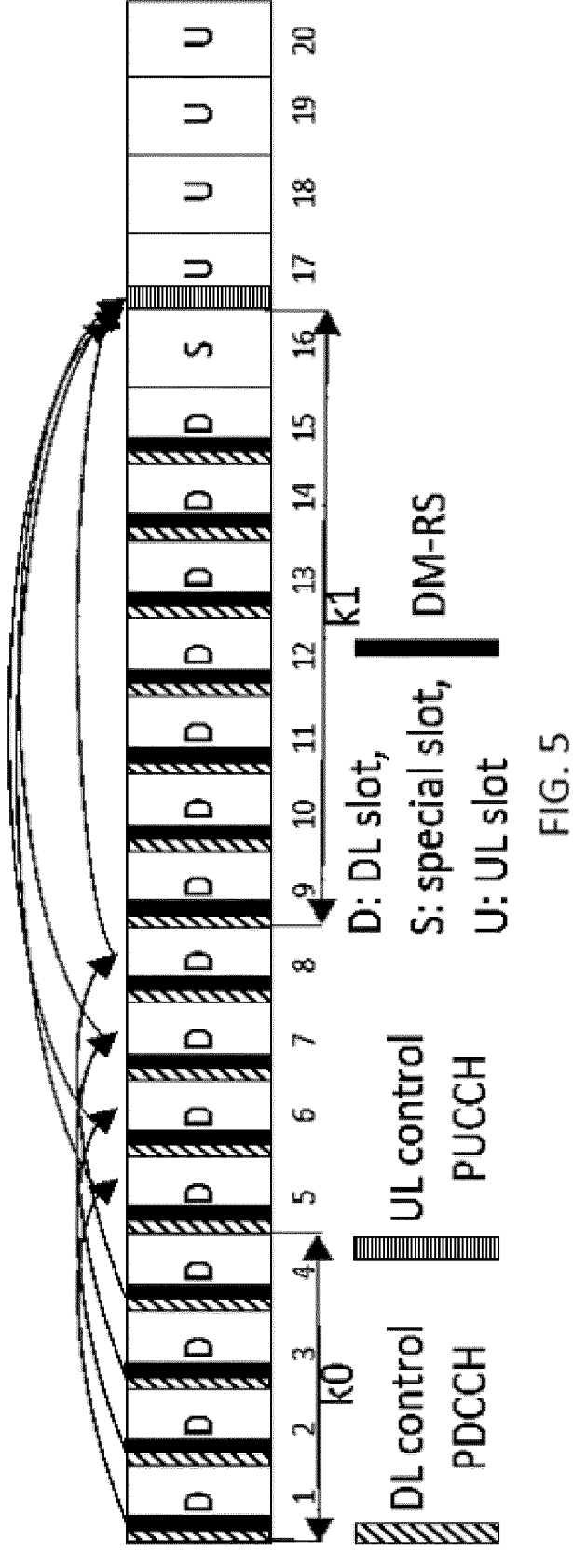
FIG. 5 illustrates an example of legacy physical downlink shared channel scheduling.

Several types of reduced overhead implementations may be possible. FIG. 5 illustrates an example of legacy PDSCH scheduling. Control information and DM-RS are sent in every slot, allowing also for the k0 time interval, which is the slot offset between DCI and its scheduled PDSCH. In addition, the k1 slot offset between PDSCH and the corresponding hybrid automatic repeat request acknowledgement (HARQ-ACK) is captured as well. This may be the highest overhead operation in terms of sending control, data and DM-RS.

Figure 6:
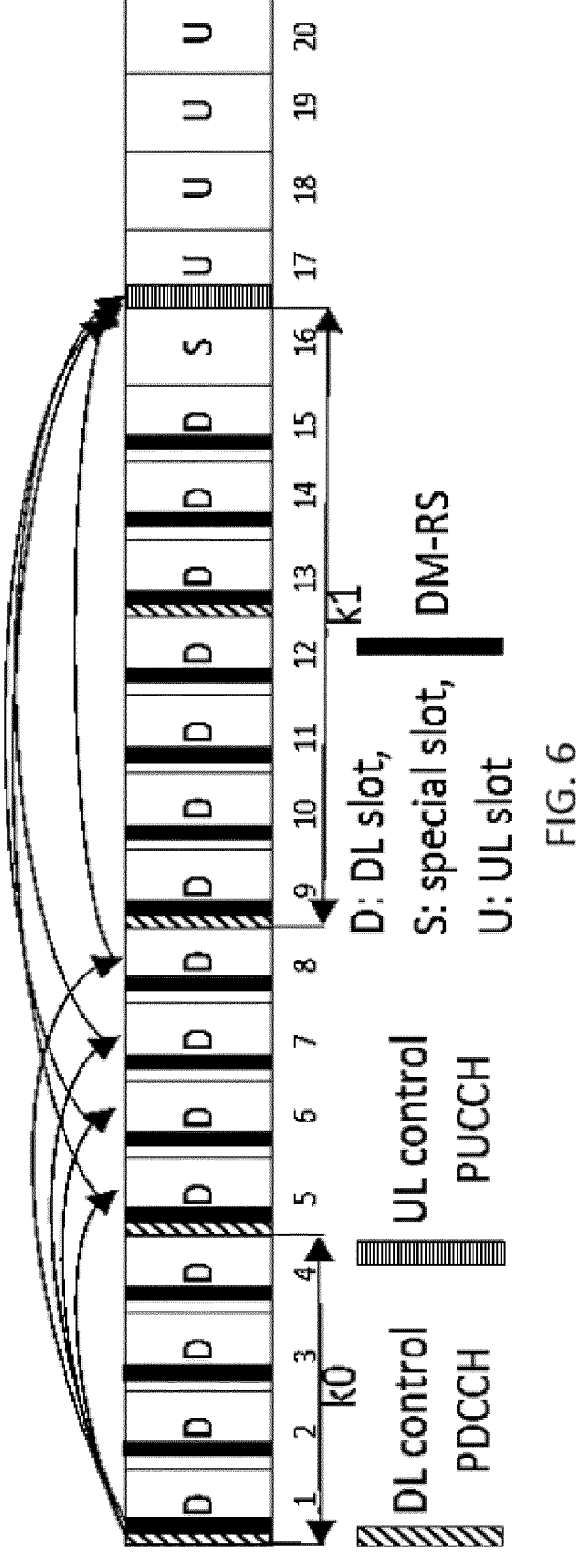
FIG. 6 illustrates an example of multi-slot physical downlink shared channel scheduling.

FIG. 6 illustrates an example of multi-slot PDSCH scheduling. Control information is sent every few slots, while front-loaded reference signals are transmitted in every DL slot. The control channel transmission is reduced, as well as the UE complexity in control channel monitoring.

Figure 7:
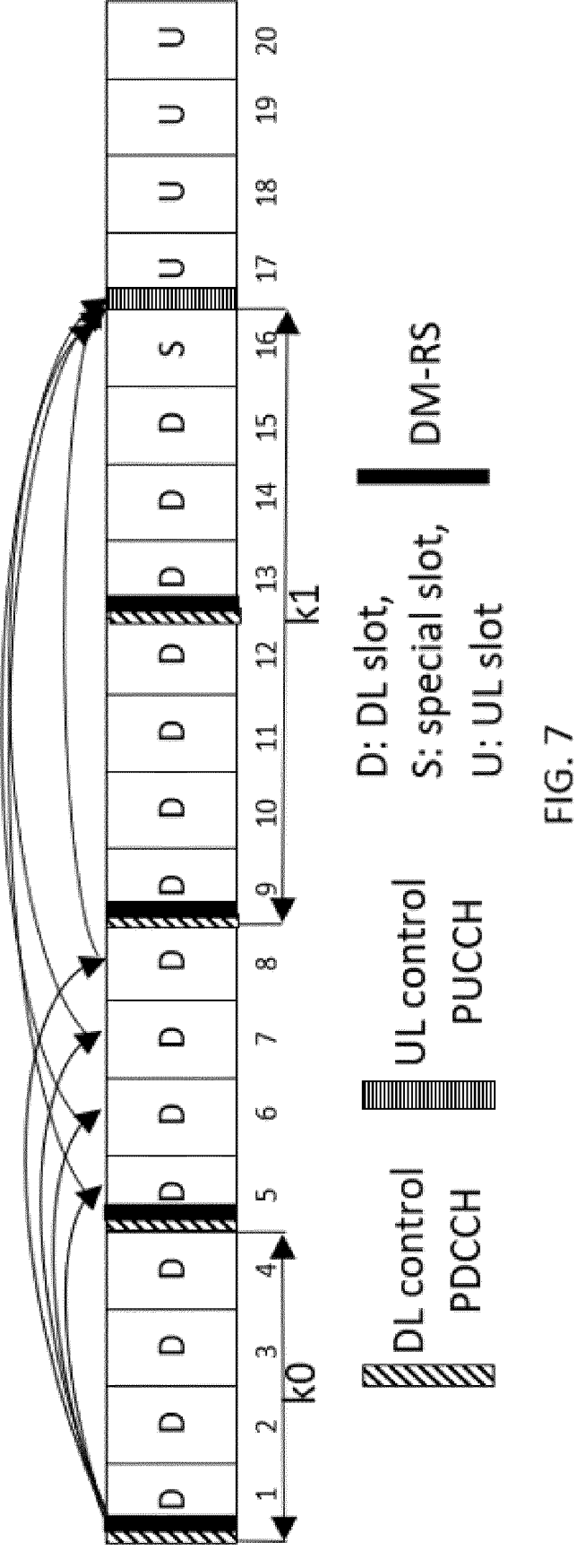
FIG. 7 illustrates another example of multi-slot physical downlink shared channel scheduling.

FIG. 7 illustrates another example of multi-slot PDSCH scheduling with low DM-RS. Control information is sent every few slots, while front-loaded reference signals are transmitted in the same DL slot as the control information.

This may be a more optimized configuration compared to the configuration of FIG. 6. In FIG. 7, overhead savings are due to less transmission of DL DM-RS. Low overhead DM-RS may still be transmitted, allowing for increased performance.

Figure 8:
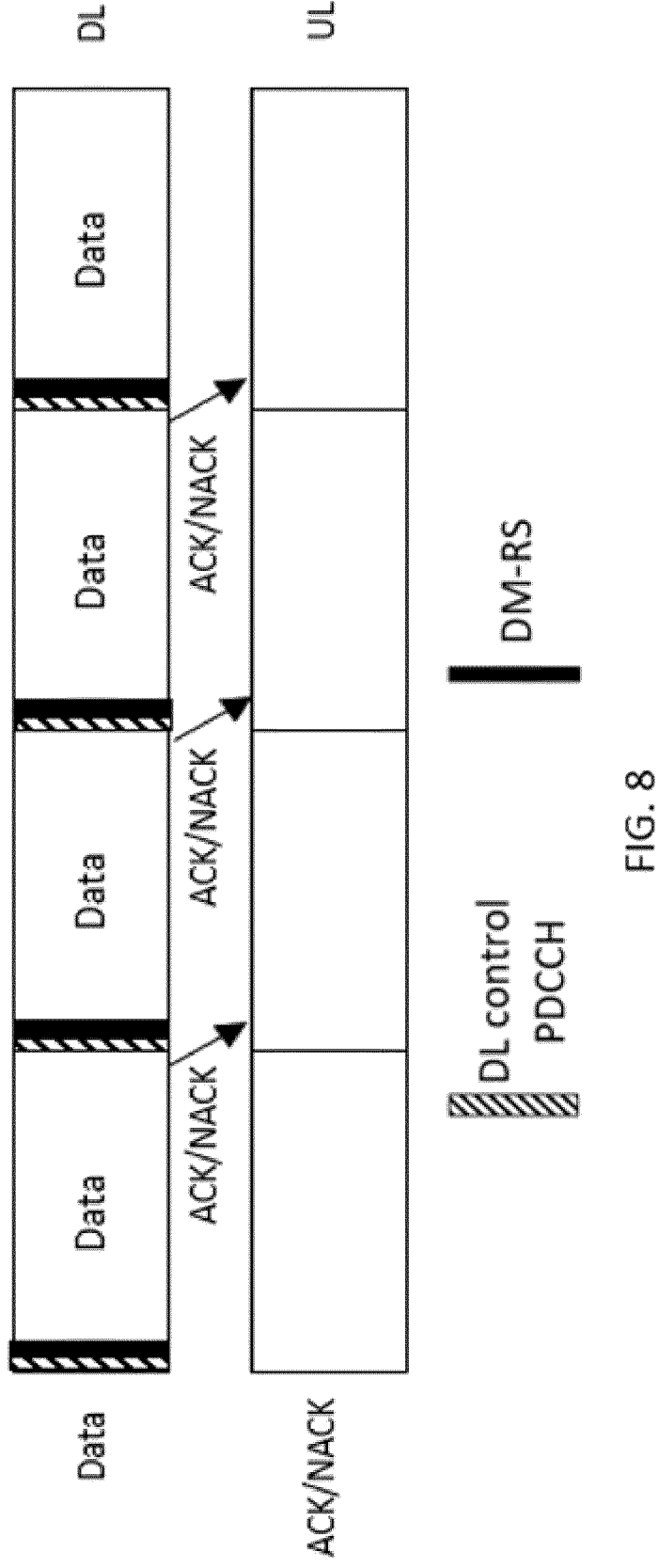
FIG. 8 illustrates an example of frequency-division duplexing physical downlink shared channel scheduling with pipeline processing.

FIG. 8 illustrates an example of FDD PDSCH scheduling with pipeline processing, which results in transmitting the transport block (TB) ACK/NACK in the first UL occasion after the DL decoding is performed.

Some exemplary embodiments may provide a prediction-based technique for transmission and reception of reference signals. Some exemplary embodiments may be based on the transmission of three types of reference signals: initial DM-RS transmission, DM-RS verification tones, and recovery DM-RS transmission. However, it should be noted that other types of reference signals than DM-RS may also be used by some exemplary embodiments.

In initial DM-RS transmission, DM-RS resource transmission occurs at the beginning of the allocated PDSCH or PUSCH transmission (or set of PDSCH or PUSCH transmissions as part of one or more symbols or slots or set of slots), allowing the UE (in DL) or the gNB (in UL) to estimate the channel estimation filter parameters in time and frequency, which are to be used further in an AI-based channel predictor.

Alternatively, the DM-RS resource transmission may be transmitted as part of a training procedure of a neural network AI algorithm, which leads to a neural network model, whose parameters may be further updated by upcoming recovery DM-RS resource transmission(s).

No further full symbol DM-RS may be transmitted during the remaining PDSCH or PUSCH allocation, or for subsequent PDSCH or PUSCH allocations as indicated by the gNB, but the UE (in DL) or the gNB (in UL) may know that a repetition of the DM-RS pattern is possible in pre-defined positions in time and frequency, and this repetition happens depending on the quality of the predicted channel.

The UE (in DL) or the gNB (in UL) may perform channel prediction for the full extent of the indicated PDSCH or PUSCH transmission(s), based on the estimated DM-RS parameters. For DL, a prediction time window may be indicated by the gNB. The prediction time window indicates the start and end time for performing the prediction.

In DM-RS verification tones transmission, the DM-RS verification tones may be transmitted periodically or in pre-defined positions, which may be aperiodic, and may be signaled implicitly or explicitly. The pre-defined positions may also serve as a blueprint for the potential transmission of recovery DM-RS. The DM-RS verification tones may also be a lower density version of the DM-RS pattern in the frequency domain, but not necessarily (due to overhead constraints). For example, a DM-RS verification tone may comprise one or more tones instead of a full DM-RS symbol. In other words, a DM-RS verification tone may comprise less radio resources than the initial DM-RS transmission. It should be noted that DM-RS is used just as an example herein, and the verification tones may also be a different type of reference signal (e.g., synchronization signal (SS), CSI-RS, phase tracking reference signal (PT-RS), remote interference measurement reference signal (RIM-RS) and/or positioning reference signal (PRS) for DL, and PT-RS and/or SRS for UL, etc.) than DM-RS.

The UE (in DL) or the gNB (in UL) estimates the channel based on the DM-RS verification tones, and compares the outcome with the predicted channel on the same tones, hence determining the estimation error. In other words, the estimation error may be determined as the difference between the estimated channel and the predicted channel. The DM-RS verification tones may not be used to provide channel quality for demodulating the data, but rather to verify the channel prediction quality. In other words, the DM-RS verification tones may comprise a partial DM-RS that is not sufficient to decode the PDSCH or PUSCH transmission. Instead, the DM-RS verification tones are just used to determine the channel prediction accuracy.

Alternatively, to further enhance the quality of the channel prediction based on the DL DM-RS verification tones, the UE may be configured to perform PDSCH-driven channel estimation according to some pre-configured PDSCH verification mask, where the verification mask may refer to a set of modulated data constellation points in data symbol level with a certain modulation scheme. The UE may use the pre-configured modulated constellation points as additional verification tones, when computing estimation errors at the actual DM-RS verification tones. Pre-configuration of the PDSCH verification mask and its indication may be done in RRC or MAC or physical layer or any combination of these. Alternatively, in an implicit indication approach, when the quality of channel prediction is not sufficient, the UE may use the latest indicated verification mask for the next DM-RS verification occasion.

If the estimation error is greater than a threshold, it is an indication of an erroneous prediction, and triggers the retransmission of a full or partial symbol DM-RS, i.e. a recovery DM-RS, for recovery purposes. The estimation error threshold may be a pre-defined threshold value.

The recovery DM-RS may be transmitted in the DL or UL OFDM symbols, or in UL discrete Fourier transform spread OFDM (DFT-s-OFDM) symbols, where verification tones would have been transmitted otherwise. There can be a full DM-RS as in the initial part of the transmission, or a partial DM-RS for recovery purposes. The amount of DM-RS may be adjusted based on the reported estimation error. For example, the error report triggering the recovery DM-RS transmission may be comprised in a CSI report or it may be a separate report. Triggering of the error report resources may be provided in the same DCI as the scheduling grant for the PDSCH. In the case of configured grant or semi-persistent data transmission allocation, the estimation error report resources may also be provided together with the configured grant configuration. ACK/NACK of data may not be sufficient, since the channel estimation quality may be hidden due to coding, and hence channel estimation errors may be covered to some extent.

When a recovery DM-RS is transmitted, no changes are done to the allocated data. This transmission may be done in a more ad-hoc mode. As the control channel is not transmitted in order to inform the existence of the recovery DM-RS transmission, the UE performs blind detection for recovery DM-RS detection, in the symbols where otherwise verification tones would have been transmitted. The so-called blueprint for reference signals positions may aid the channel estimation implementation, as this brings predictability in terms of budgeting the complexity in the receiver.

Data puncturing may occur, when DM-RS verification tones are transmitted. Herein data puncturing means that something else is transmitted instead of data. Lower DM-RS density compared to the initial DM-RS transmission may lead to a lower puncturing effect.

Figure 9:
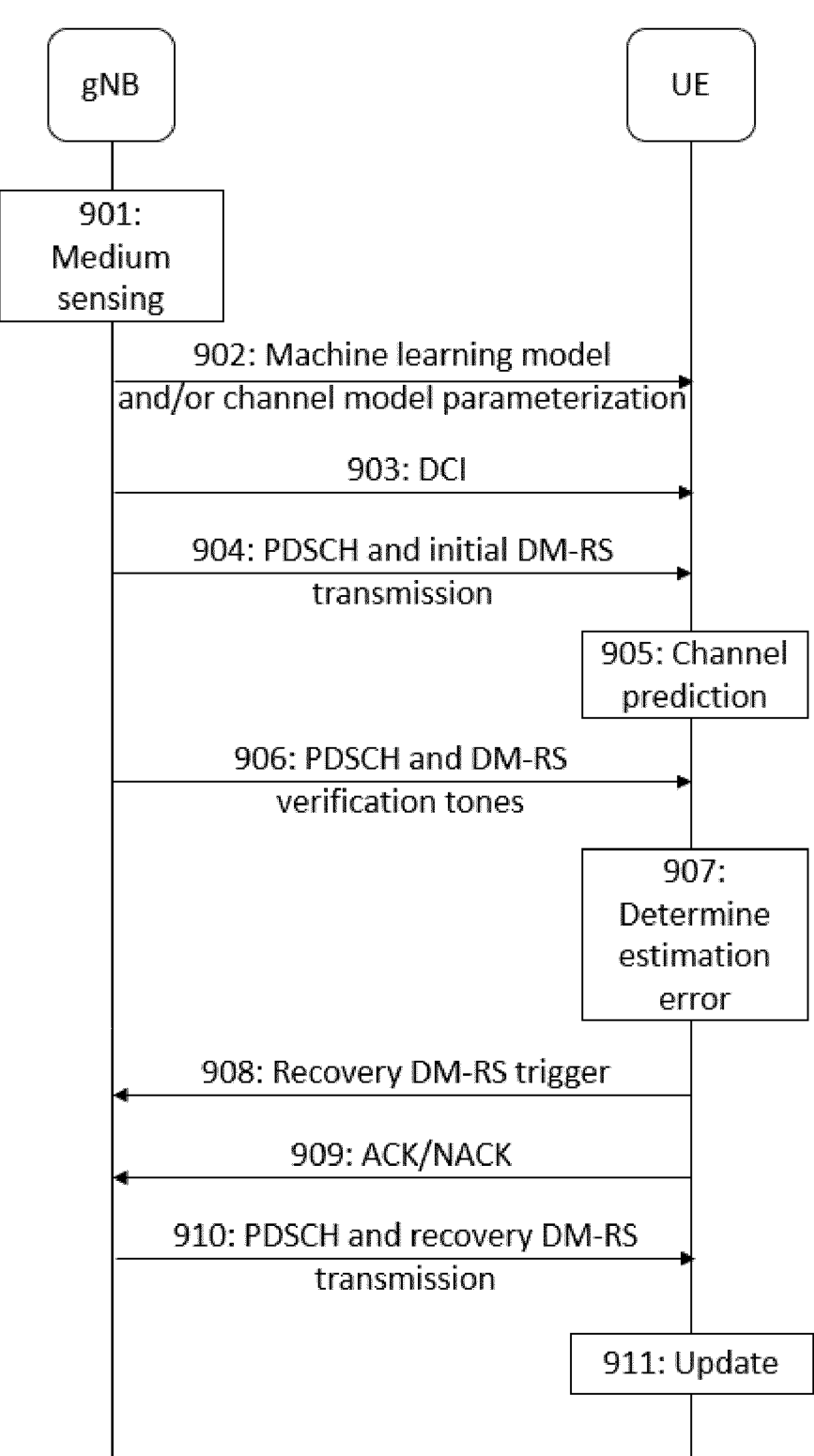
FIGS. 9-10 illustrate signaling diagrams according to some exemplary embodiments.

FIG. 9 illustrates a signaling diagram according to an exemplary embodiment. Referring to FIG. 9, a base station such as a gNB performs 901 medium sensing, i.e. channel profile/model type of estimation, to obtain a channel model parameterization. For example, a base station in a rural area may know that there is a rural area type of channel experienced in both DL and UL. As another example, a base station in an urban environment may know that there is an urban environment type of channel experienced in both DL and UL. The parameterization may be based on long-term and/or short-term medium sensing statistics, for example.

The base station may transmit 902 the channel model parameterization and/or a pre-trained machine learning model, for example a neural network model, to the UE in order to assist the UE with channel estimation. Alternatively, the machine learning model may be pre-configured at the UE, in which case the base station does not need to transmit it to the UE.

The base station transmits 903 DCI over PDCCH to the UE regarding PDSCH and DM-RS allocation, and also indicating the possible UL time units, where information about channel estimation error may be provided as feedback to the base station.

The base station transmits 904 PDSCH and an initial DM-RS transmission to the UE. The initial DM-RS transmission may also be referred to as a first reference signal transmission herein. The UE performs 905 channel prediction based on the initial DM-RS transmission to predict future conditions of the radio channel associated with the PDSCH transmission. The UE may use the machine learning model and/or the channel model parameterization to perform the channel prediction. As a non-limiting example, the channel prediction may be performed by using a Kalman filter, which uses a state-space representation based on which the channel, modeled as a state, can be predicted.

The base station transmits 906 PDSCH and one or more DM-RS verification tones to the UE. The UE determines 907 an estimation error associated with the channel prediction by estimating the current channel based on the one or more DM-RS verification tones, and comparing the current channel estimate with the channel prediction performed previously. In other words, the UE determines how accurate the predictions are compared to the actual channel conditions. It should be noted that the one or more DM-RS verification tones are received after receiving the initial DM-RS transmission.

If the estimation error exceeds a pre-defined threshold value, the UE transmits 908 a recovery DM-RS trigger, i.e. an indication indicative of the estimation error, to the base station to cause the base station to transmit a recovery DM-RS transmission to the UE. For example, the recovery DM-RS trigger may indicate the amount of the estimation error, or it may indicate that the estimation error exceeds the pre-defined threshold value.

The UE transmits 909 a PDSCH ACK or NACK to the base station to indicate whether or not it has successfully decoded the data comprised in the PDSCH transmission. The recovery DM-RS trigger may be comprised in the same message as the ACK or NACK, or the recovery DM-RS trigger may be transmitted in a separate message than the ACK or NACK. For example, the ACK or NACK may be transmitted with a recovery DM-RS flag indicating that the channel prediction performance is low, in order to trigger a recovery DM-RS transmission from the base station.

The base station transmits 910 PDSCH and a recovery DM-RS transmission to the UE. The recovery DM-RS transmission may also be referred to as a second reference signal transmission herein. The UE may update 911 the machine learning model and/or the parameterization based on the recovery DM-RS transmission. Alternatively, the recovery DM-RS transmission may be used to temporarily correct the channel estimation without updating the machine learning model, for example if there are some temporary changes in the radio channel.

In another exemplary embodiment, the initial DM-RS transmission, the DM-RS verification tone(s), and the recovery DM-RS transmission may be associated with a PDCCH transmission instead of a PDSCH transmission.

Figure 10:
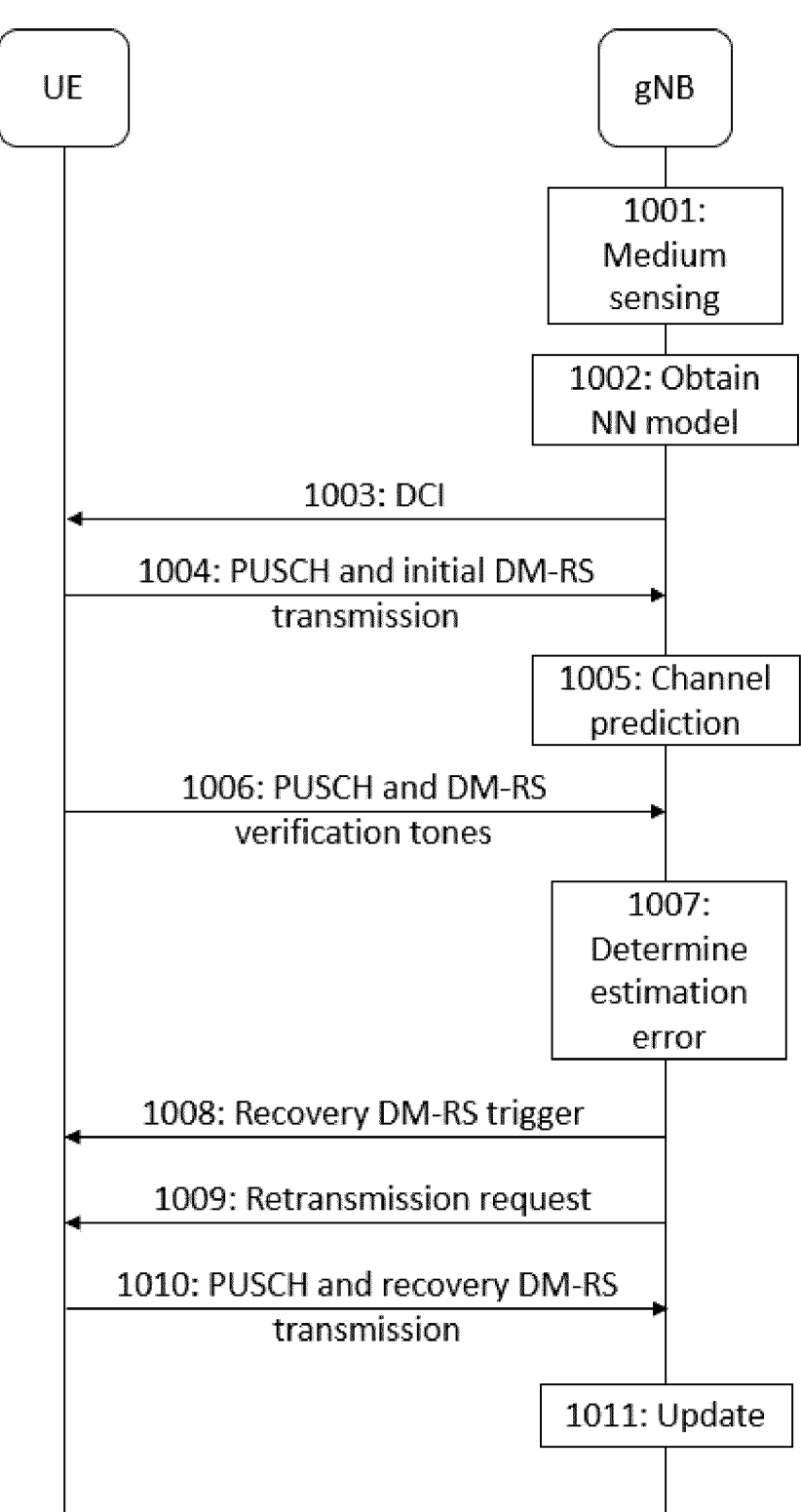

Another exemplary embodiment may be applied for UL transmission, such as UL DM-RS. FIG. 10 illustrates a signaling diagram according to an exemplary embodiment for UL DM-RS. Referring to FIG. 10, a base station such as a gNB performs 1001 medium sensing resulting in a channel model parameterization. The parameterization may be based on long-term and/or short-term medium sensing statistics, for example.

The base obtains 1002 a machine learning model, for example a neural network model, in order to assist the base station with channel estimation. For example, the base station may train the machine learning model by using reinforcement learning or any other type of machine learning, or the base station may obtain a pre-trained machine learning model for example from an internal or external database.

The base station transmits 1003 downlink control information (DCI) over PDCCH to the UE regarding PUSCH and DM-RS allocation.

The UE transmits 1004 PUSCH and an initial DM-RS transmission based on the DCI to the base station. The base station performs 1005 channel prediction based on the initial DM-RS transmission to predict future conditions of the radio channel associated with the PUSCH (or PUCCH) transmission. The base station may use the machine learning model and/or the channel model parameterization to perform the channel prediction.

The UE transmits 1006 PUSCH and one or more DM-RS verification tones to the base station. The base station determines 1007 an estimation error associated with the channel prediction by estimating the current channel based on the one or more DM-RS verification tones, and comparing the current channel estimate with the channel prediction performed previously. In other words, the base station determines how accurate the predictions are compared to the actual channel conditions.

If the estimation error exceeds a pre-defined threshold value, the base station transmits 1008 a recovery DM-RS trigger, i.e. an indication indicative of the estimation error, to the UE to cause the UE to transmit a recovery DM-RS transmission to the base station. In addition, the one or more DM-RS verification tones may be used as a way to check if the UE is able to maintain the phase alignment along the transmitted UL symbols, which may also be a pre-requisite for accurate channel estimation.

The base station may indicate 1009 a retransmission request to the UE for requesting retransmission of the PUSCH data. The recovery DM-RS trigger may be comprised in the same message as the retransmission request, or the recovery DM-RS trigger may be transmitted separately from the retransmission request. For example, the retransmission request may be transmitted with a recovery DM-RS flag indicating a low channel prediction performance, thus triggering a recovery DM-RS transmission from the UE.

The UE transmits 1010 PUSCH and a recovery DM-RS transmission to the base station. The base station may update 1011 the machine learning model and/or the parameterization based on the recovery DM-RS transmission. Alternatively, the recovery DM-RS transmission may be used to temporarily correct the channel estimation without updating the machine learning model, for example if there are some temporary changes in the radio channel.

In another exemplary embodiment, the initial DM-RS transmission, the DM-RS verification tone(s), and the recovery DM-RS transmission may be associated with a PUCCH transmission instead of a PUSCH transmission.

Figure 11:
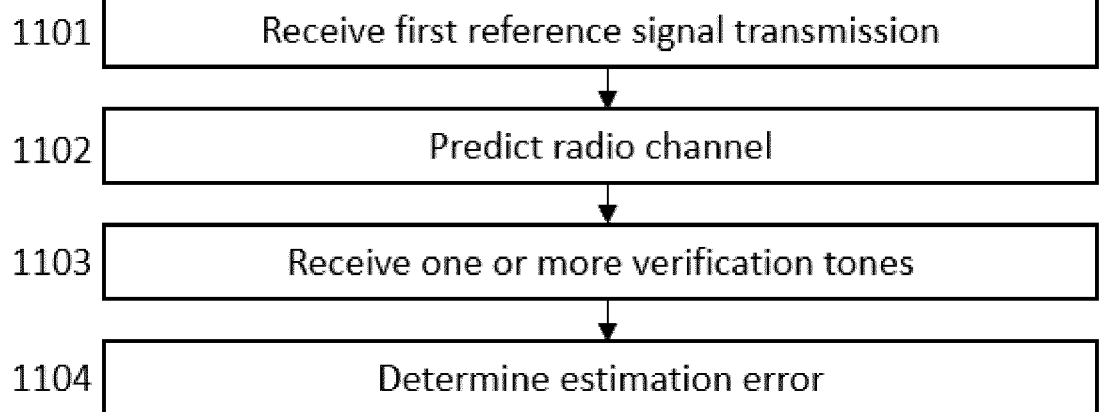
FIG. 11 illustrates a flow chart according to an exemplary embodiment.

FIG. 11 illustrates a flow chart according to an exemplary embodiment. The functions illustrated in FIG. 11 may be performed by an apparatus such as, or comprised in, a base station or a UE. Referring to FIG. 11, a first reference signal transmission associated with a radio channel is received 1101. During the first reference signal transmission, at least one first DM-RS is transmitted. The first reference signal transmission may be, for example, an initial DM-RS transmission, as described above. Future conditions of the radio channel are predicted 1102 based at least partly on the first reference signal transmission. In other words, the effect of the radio channel on a signal transmission during one or more future time instants is predicted. One or more verification tones associated with the radio channel are received 1103. The one or more verification tones may be, for example, DM-RS verification tones as described above. An estimation error associated with the predicted future conditions of the radio channel is determined 1104 based at least partly on the one or more verification tones.

The functions and/or blocks described above by means of FIGS. 9-11 are in no absolute chronological order, and some of them may be performed simultaneously or in an order differing from the described one. Other functions and/or blocks may also be executed between them or within them.

In an exemplary embodiment, the UE may implicitly assume the transmission of initial DM-RS, when it has not been previously scheduled (or the UE has not scheduled to receive) on the same PDSCH beam (i.e. assume the quasi-co-location, QCL, source for PDSCH DM-RS reception to be the DL reference signal indicated by the transmission coordination indication, TCI, state) for: one or more slots, one or more PDSCH transmission windows as described herein, or other defined period of time, such as a configurable number of slots or set of slots.

In another exemplary embodiment, the UE may implicitly assume the network to not transmit the initial DM-RS, when the PDSCH transmission assumptions beam that is scheduled in subsequent periods (of PDSCH transmissions or windows) is the same. The PDSCH transmission assumptions may be, for example, the same transmission beam (same TCI state used for PDSCH, i.e. DL reference signal used for QCL source for the DM-RS is the same).

In another exemplary embodiment, the UE may indicate to the network to initiate an initial DM-RS transmission (e.g. restart of the procedure), if it determines that the reception assumptions change, for example if RX spatial filter or another panel changes. For example, the indication to restart may be implicit based on the beam reporting, which may include at least some information of UE reception assumptions, such as panel or RX spatial filter.

Figure 12:
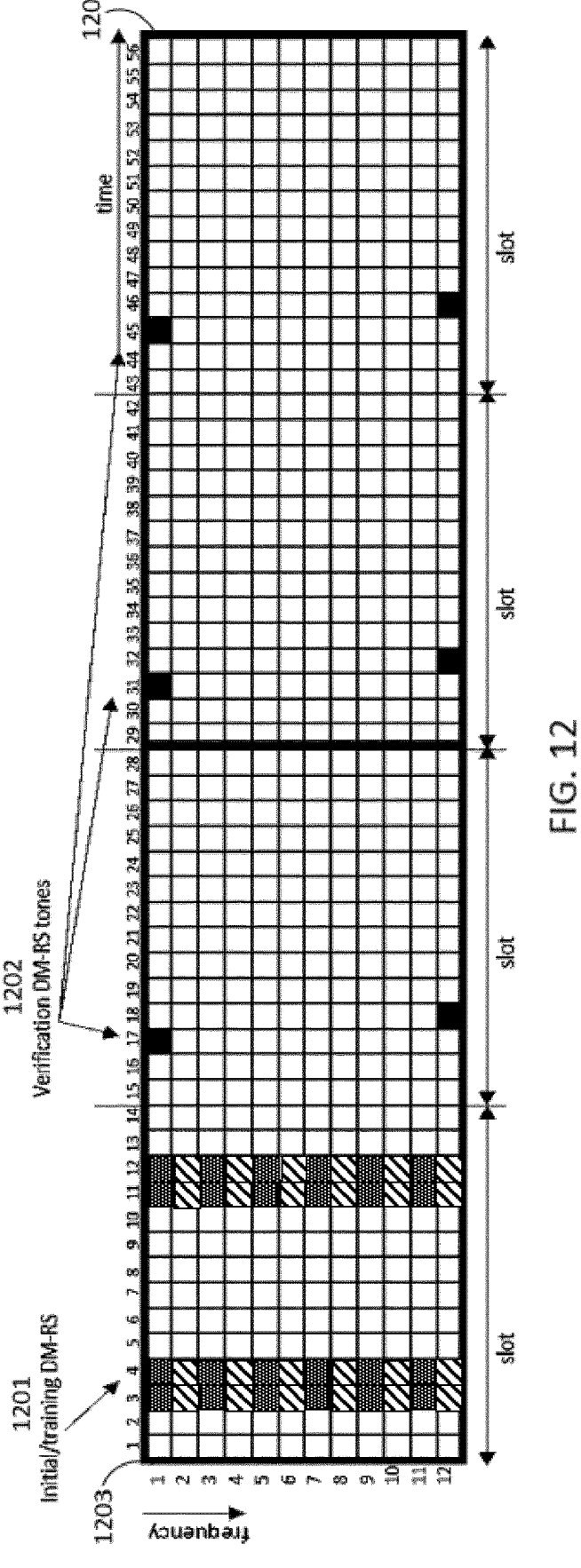
FIG. 12 illustrates an example of an initial demodulation reference signal transmission.

FIG. 12 illustrates an example of an initial DM-RS transmission 1201 according to an exemplary embodiment. The cells in FIG. 12 illustrate resource elements. FIG. 12 depicts reduced DM-RS overhead transmission with channel estimation verification tones 1202. DM-RS transmission occurs at the beginning of the allocated PDSCH transmission (or set of PDSCH transmissions), allowing for the estimation of the channel estimation filter parameters, which may be used further in an AI-based channel predictor. Referring to FIG. 12, a legacy system would have transmitted DM-RS in symbols 17, 31 and 45. However, in this exemplary embodiment, no further full symbols of DM-RS are transmitted during the PDSCH allocation, or for subsequent PDSCH allocations as indicated by the gNB. The UE knows that DM-RS verification tones are present in the selected positions of the blueprint, and that a repetition of the DM-RS pattern is possible in the selected positions of the blueprint, their presence depending on the quality of the predicted channel. If the channel prediction is poor, more recovery DM-RS may be transmitted.

Figure 13:
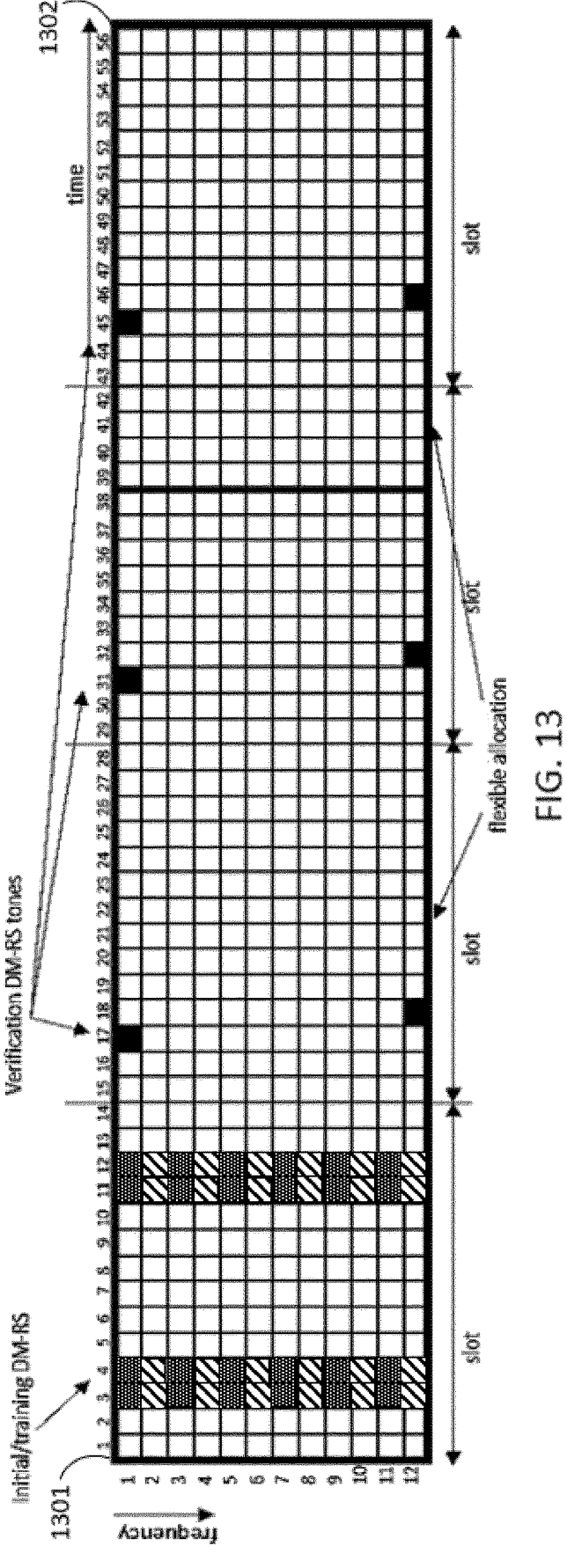
FIGS. 13-14 illustrate flexible allocations with flexible demodulation reference signal transmission.

The UE may perform channel prediction for the full extent of the indicated PDSCH transmission(s) based on the estimated DM-RS parameters. FIGS. 12 and 13 illustrate allocations of two TBs 1203, 1204, 1301, 1302. In FIG. 12, the allocation is based on subframes, while in FIG. 13 the allocation is based on flexible symbols, wherein the concept of slots or subframes is not applicable. FIG. 13 illustrates flexible allocations with flexible DM-RS transmission according to an exemplary embodiment.

When performing the initial DM-RS transmission, the gNB may also define a prediction time window, during which the UE (or gNB in case of UL) should perform the channel prediction. This may also be the time interval until the next scheduled full DM-RS transmission. During the prediction time window, no other DM-RS are transmitted, except the verification tones and the recovery DM-RS (if requested by the UE).

Figure 14:
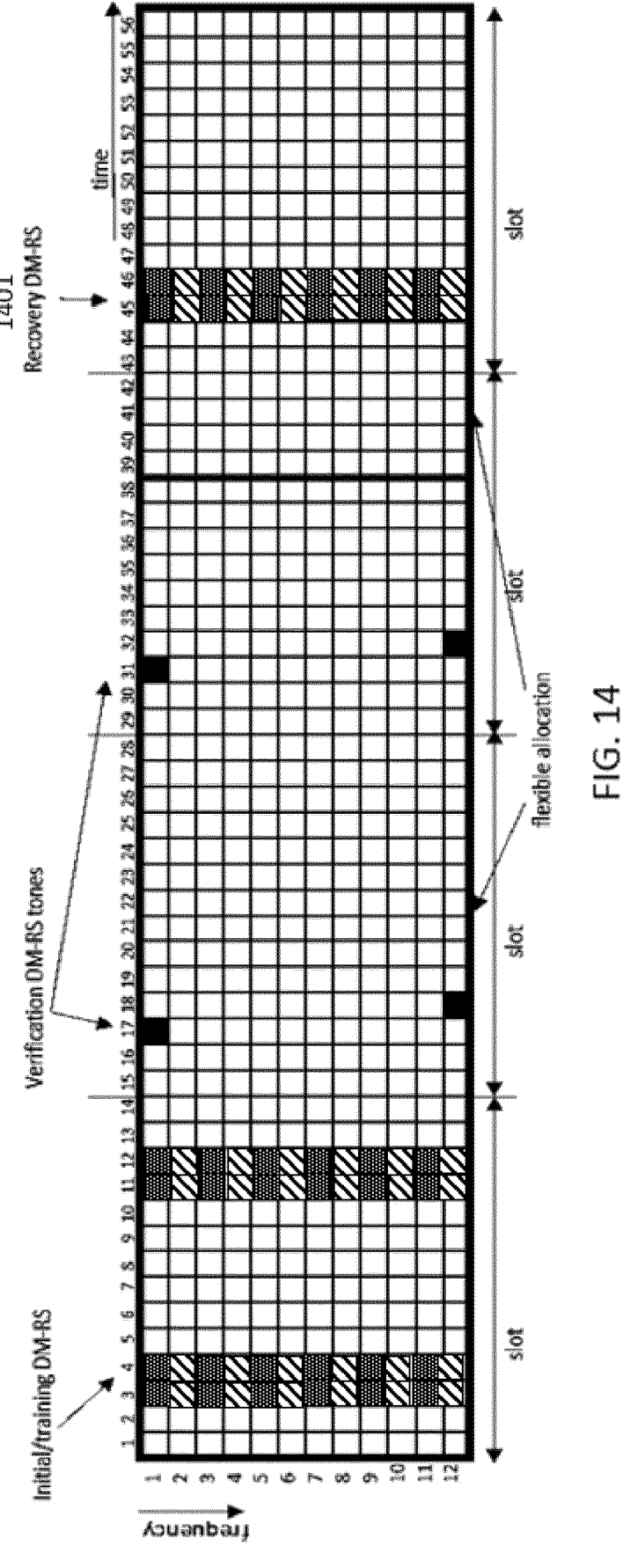

FIG. 14 illustrates flexible allocations with flexible DM-RS transmission according to another exemplary embodiment. FIG. 14 depicts, in addition to some of the elements described above, the transmission of a recovery DM-RS, which is done in the symbols, where verification tones would have been transmitted otherwise. The recovery DM-RS may be a full DM-RS (illustrated in FIG. 14) as in the initial part of the transmission, or a partial DM-RS. The amount of DM-RS may be adjusted based on the estimation error reported by the UE. When recovery DM-RS is transmitted, no changes are done to the allocated data, as this recovery DM-RS transmission is done in a more ad-hoc mode, and control information is not available to indicate this transmission. The UE may perform blind detection for recovery DM-RS detection in the symbols, where verification tones would have been transmitted otherwise (e.g. in symbol 45). Using the so-called blueprint for positions may aid the channel estimation implementation, as this brings predictability in terms of budgeting the complexity in the receiver, while also the blind detection needs to be performed in a limited amount of symbols. The transmission of the recovery DM-RS may also be performed based on the subframes illustrated in FIG. 12.

Figure 15:
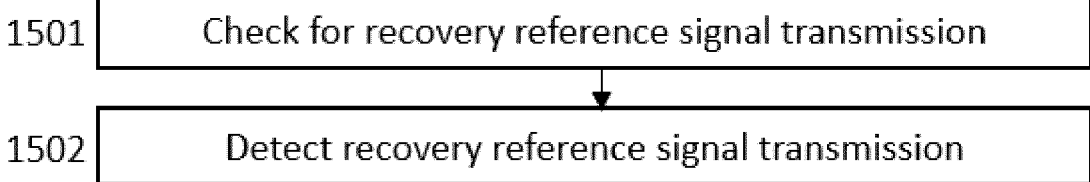
FIG. 15 illustrates a flow chart according to an exemplary embodiment.

FIG. 15 illustrates a flow chart according to an exemplary embodiment for performing blind detection for a recovery reference signal transmission. The functions illustrated in FIG. 15 may be performed by an apparatus such as, or comprised in, a base station or a UE. Referring to FIG. 15, it is checked 1501 whether a recovery reference signal transmission is received in a symbol scheduled for a further (i.e. additional) verification tone. Based on the checking, the second reference signal transmission is detected 1502 in the symbol scheduled for the further verification tone. Thus, this exemplary embodiment enables detecting the recovery reference signal transmission, even if the transmitter of the recovery reference signal transmission has not indicated the existence of the recovery reference signal transmission. The detected recovery reference signal transmission may then be used to improve the channel prediction accuracy. An ACK may be reported after decoding the data.

Figure 16:
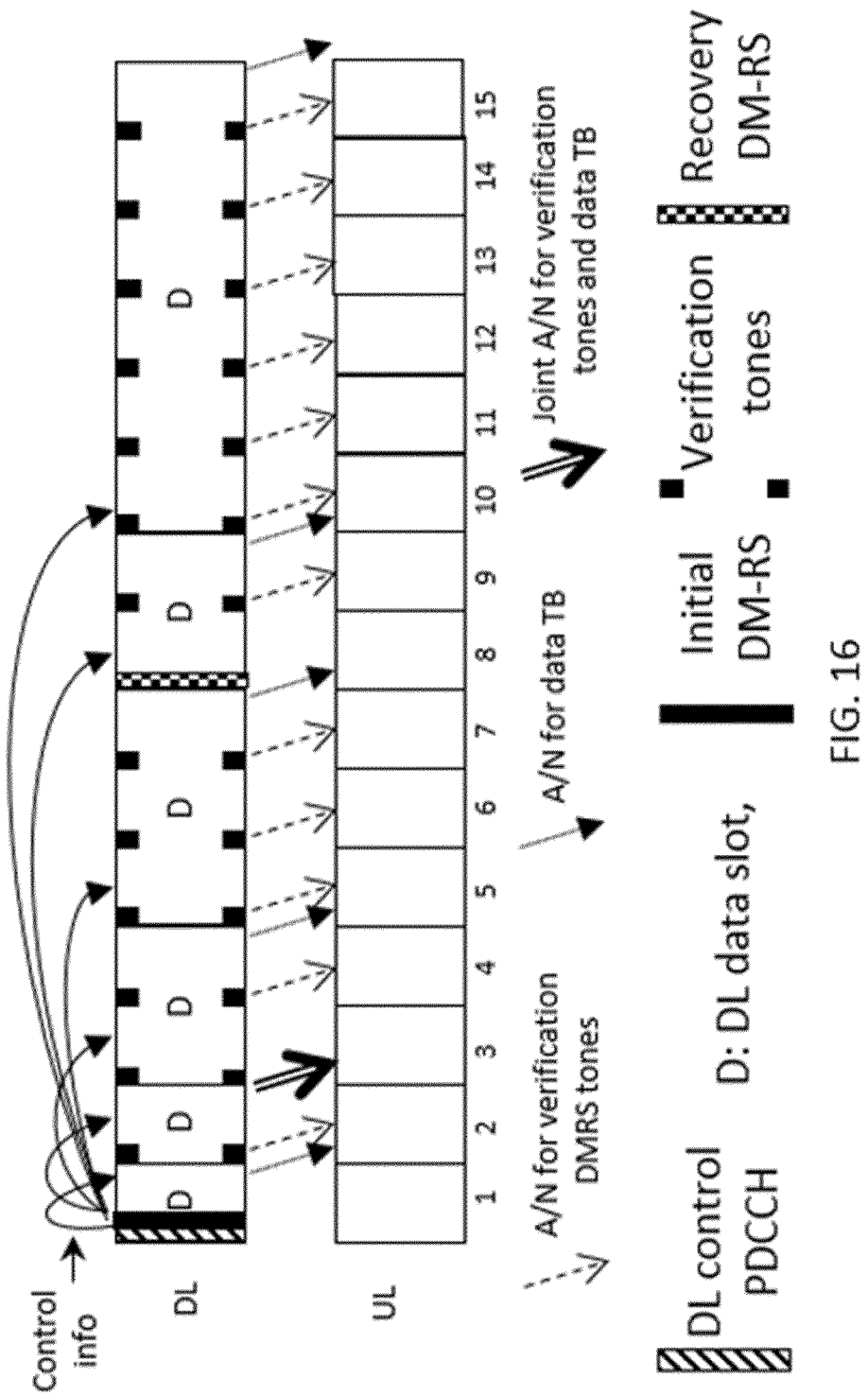
FIG. 16 illustrates triggering the transmission of a recovery demodulation reference signal in a frequency-division duplexing setup.

FIG. 16 illustrates the procedures for triggering the transmission of a recovery DM-RS in an FDD setup according to an exemplary embodiment. This example is based on flexible time allocations or slots for the DL. For simplicity, it is assumed that UL transmission opportunities are available for example in a dedicated channel for AI/ML retraining, in the form of a feedback loop facilitating iterative learning. DL control information is transmitted in the first symbols for the subsequent transport blocks with different lengths in time. Initial DM-RS is transmitted in the beginning of the transmission. After this, the system is transmitting DM-RS verification tones in pre-defined positions. While ACK/NACK (A/N) is transmitted at the end of the TB decoding, the triggering of the recovery DM-RS may be transmitted after each occasion, where the estimation error is computed. For example, the UE may be configured to understand the presence of recovery DM-RS resource elements after one or more NACKs. For example, if the UE has transmitted a NACK feedback, then it may on the next PDSCH period (in the next slot after the feedback or in an upcoming slot after the feedback symbol) expect the network to provide added recovery tones (i.e. added DM-RS on specific resource elements). These resource element positions may be the verification tone symbols replaced with the recovery DM-RS. Then the UE may assume that there are no PDSCH on those resource elements.

It should be noted that there may be occasions, where the data ACK/NACK and recovery DM-RS trigger may be transmitted in the same occasion, either as separate messages or jointly encoded. This may be possible at the end of the TB transmission. However, joint encoding may not always be the best solution, as TB decoding is based on additional robustness mechanisms such as cyclic redundancy check (CRC), allowing for a lower quality channel estimate to still deliver a correct decoding, hence masking a degradation of channel estimation. This is why an independent transmission of the recovery DM-RS trigger may be more beneficial.

Figure 17:
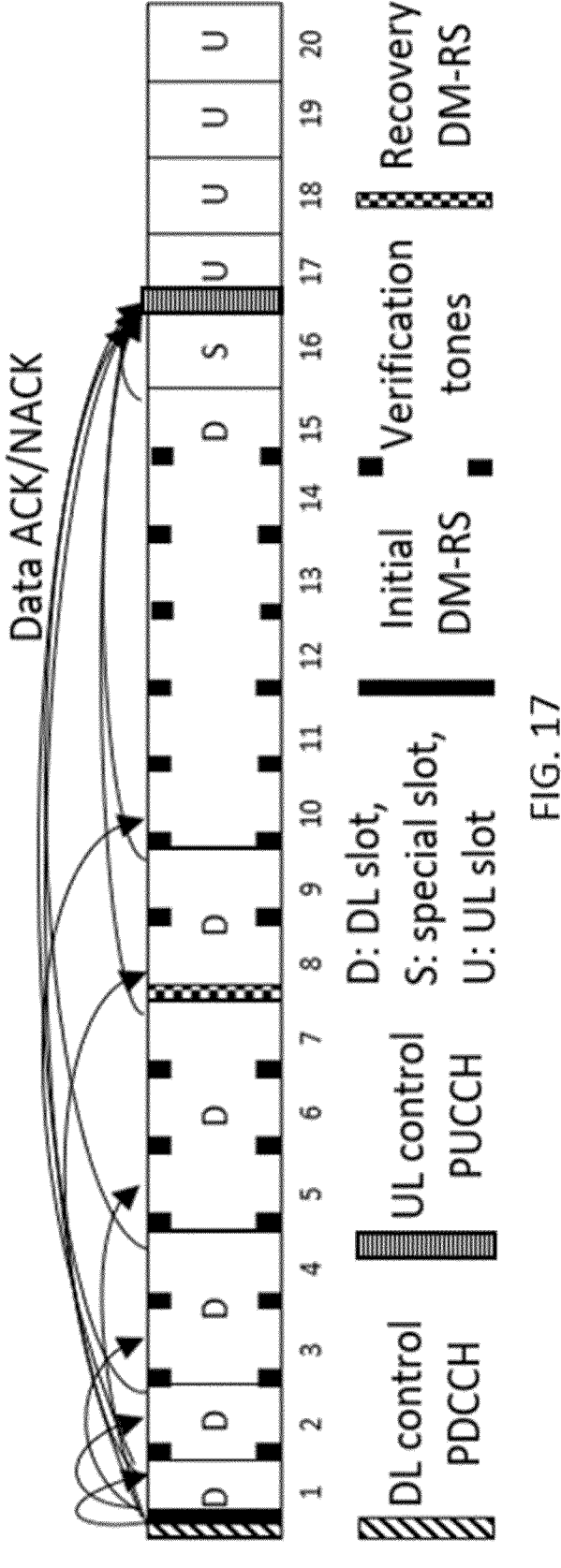
FIG. 17 illustrates triggering the transmission of a recovery demodulation reference signal in a time-division duplexing setup.

FIG. 17 illustrates the procedures for triggering the transmission of a recovery DM-RS in a TDD setup according to an exemplary embodiment.

A technical advantage provided by some exemplary embodiments is that they may reduce reference signal transmission overhead. Some exemplary embodiments may reduce signaling while maintaining or improving system performance. In other words, unnecessary reference signal transmissions may be prevented by triggering the recovery DM-RS signal only if the estimation error becomes too large.

Figure 18:
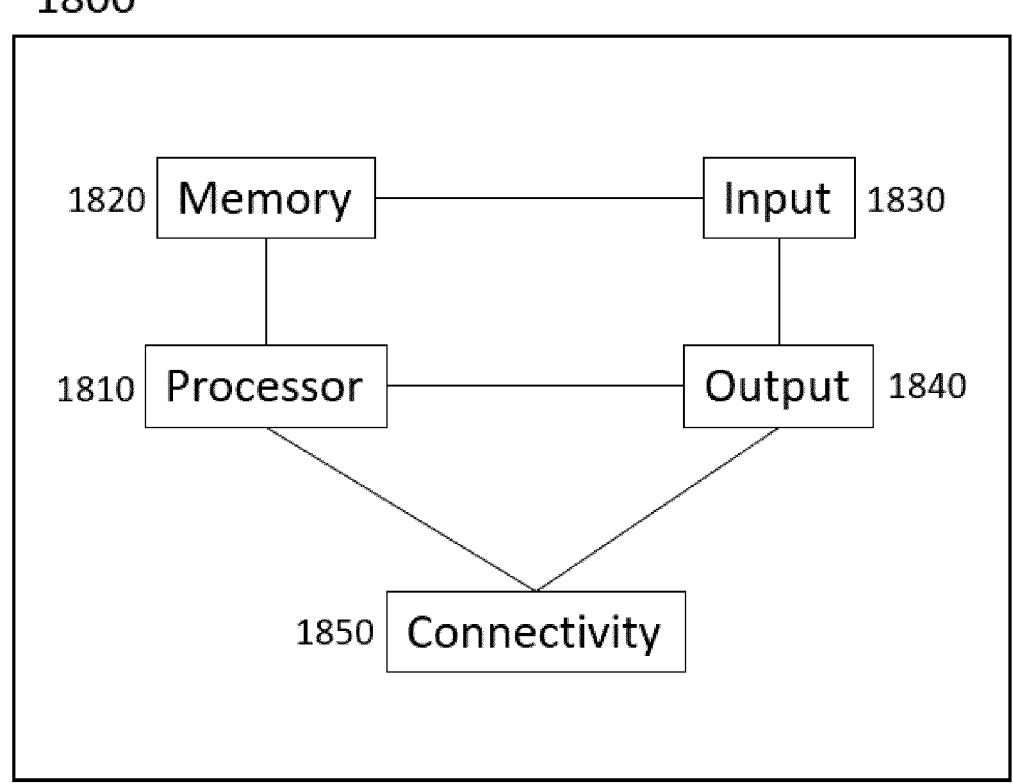
FIGS. 18-19 illustrate apparatuses according to some exemplary embodiments.

FIG. 18 illustrates an apparatus 1800, which may be an apparatus such as, or comprised in, a terminal device, according to an exemplary embodiment. A terminal device may also be referred to as a UE or user equipment herein. The apparatus 1800 comprises a processor 1810. The processor 1810 interprets computer program instructions and processes data. The processor 1810 may comprise one or more programmable processors. The processor 1810 may comprise programmable hardware with embedded firmware and may, alternatively or additionally, comprise one or more application-specific integrated circuits (ASICs).

The processor 1810 is coupled to a memory 1820. The processor is configured to read and write data to and from the memory 1820. The memory 1820 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 1820 stores computer readable instructions that are executed by the processor 1810. For example, non-volatile memory stores the computer readable instructions and the processor 1810 executes the instructions using volatile memory for temporary storage of data and/or instructions.

The computer readable instructions may have been pre-stored to the memory 1820 or, alternatively or additionally, they may be received, by the apparatus, via an electromagnetic carrier signal and/or may be copied from a physical entity such as a computer program product. Execution of the computer readable instructions causes the apparatus 1800 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1800 may further comprise, or be connected to, an input unit 1830. The input unit 1830 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1830 may comprise an interface to which external devices may connect to.

The apparatus 1800 may also comprise an output unit 1840. The output unit may comprise or be connected to one or more displays capable of rendering visual content, such as a light emitting diode (LED) display, a liquid crystal display (LCD) and/or a liquid crystal on silicon (LCoS) display. The output unit 1840 may further comprise one or more audio outputs. The one or more audio outputs may be for example loudspeakers.

The apparatus 1800 further comprises a connectivity unit 1850. The connectivity unit 1850 enables wireless connectivity to one or more external devices. The connectivity unit 1850 comprises at least one transmitter and at least one receiver that may be integrated to the apparatus 1800 or that the apparatus 1800 may be connected to. The at least one transmitter comprises at least one transmission antenna, and the at least one receiver comprises at least one receiving antenna. The connectivity unit 1850 may comprise an integrated circuit or a set of integrated circuits that provide the wireless communication capability for the apparatus 1800. Alternatively, the wireless connectivity may be a hardwired application-specific integrated circuit (ASIC). The connectivity unit 1850 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1800 may further comprise various components not illustrated in FIG. 18. The various components may be hardware components and/or software components.

Figure 19:
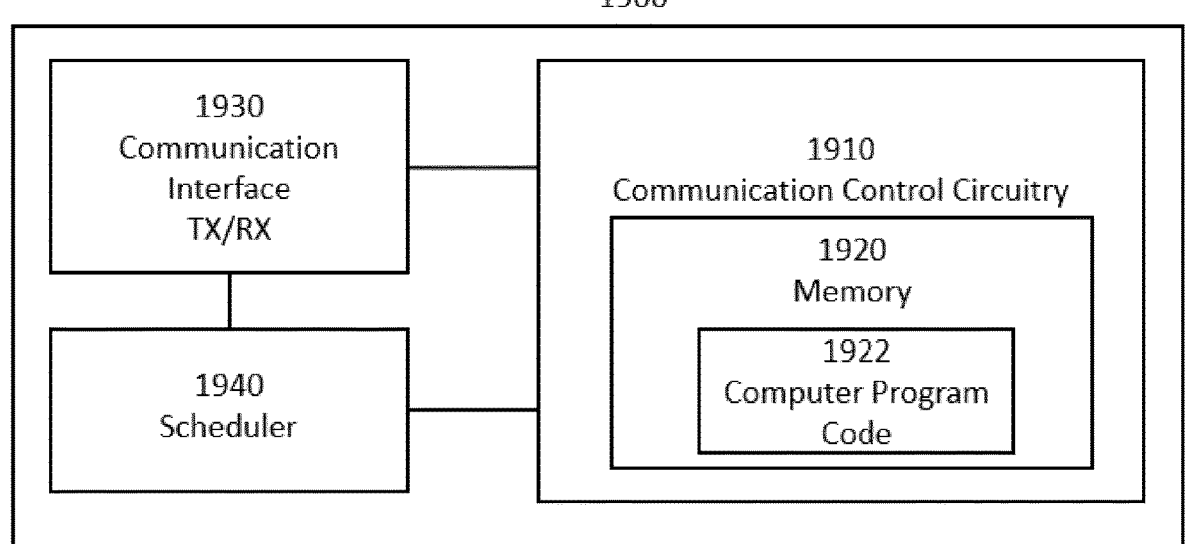

The apparatus 1900 of FIG. 19 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 1900 may be an electronic device comprising one or more electronic circuitries. The apparatus 1900 may comprise a communication control circuitry 1910 such as at least one processor, and at least one memory 1920 including a computer program code (software) 1922 wherein the at least one memory and the computer program code (software) 1922 are configured, with the at least one processor, to cause the apparatus 1900 to carry out some of the exemplary embodiments described above.

The memory 1920 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1900 may further comprise a communication interface 1930 comprising hardware and/or software for realizing communication connectivity according to one or more communication protocols. The communication interface 1930 comprises at least one transmitter (TX) and at least one receiver (RX) that may be integrated to the apparatus 1900 or that the apparatus 1900 may be connected to. The communication interface 1930 provides the apparatus with radio communication capabilities to communicate in the cellular communication system. The communication interface may, for example, provide a radio interface to terminal devices. The apparatus 1900 may further comprise another interface towards a core network such as the network coordinator apparatus and/or to the access nodes of the cellular communication system. The apparatus 1900 may further comprise a scheduler 1940 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these tech- niques may be implemented in hardware (one or more devices), firmware (one or more devices), software (one or more modules), or combinations thereof. For a hardware implementation, the apparatus(es) of exemplary embodi- ments may be implemented within one or more application- specific integrated circuits (ASICs), digital signal processors (DSPs), digital signal processing devices (DSPDs), pro- grammable logic devices (PLDs), field programmable gate arrays (FPGAs), graphics processing units (GPUs), proces- sors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The soft- ware codes may be stored in a memory unit and executed by processors. The memory unit may be implemented within the processor or externally to the processor. In the latter case, it can be communicatively coupled to the processor via various means, as is known in the art. Additionally, the components of the systems described herein may be rear- ranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be imple- mented in various ways. The embodiments are not limited to the exemplary embodiments described above, but may vary within the scope of the claims. Therefore, all words and expressions should be interpreted broadly, and they are intended to illustrate, not to restrict, the exemplary embodi- ments.

The invention claimed is:

1. An apparatus comprising at least one processor, and at least one memory including computer program code, wherein the at least one memory and the computer program code are configured, with the at least one processor, to cause the apparatus to:
   receive a first reference signal transmission associated with a radio channel;
   predict future conditions of the radio channel based at least partly on the first reference signal transmission;
   receive one or more verification tones associated with the radio channel;
   determine, based at least partly on the one or more verification tones, an estimation error associated with the predicted future conditions of the radio channel;
   transmit an indication indicative of the estimation error, if the estimation error exceeds a pre-defined threshold value; and
   receive, in response to the indication indicative of the estimation error, a second reference signal transmission associated with the radio channel.

2. The apparatus according to claim 1, wherein a machine learning model is used to predict the future conditions of the radio channel; and
   wherein the apparatus is further caused to update the machine learning model based at least partly on the second reference signal transmission.

3. The apparatus according to claim 1, wherein an amount of a demodulation reference signal for the second reference signal transmission is adjusted based on the indication indicative of the estimation error.

4. The apparatus according to claim 3, wherein the apparatus is further caused to:
   check whether the second reference signal transmission is received in a symbol scheduled for a further verifica- tion tone; and
   based on the checking, detect the second reference signal transmission in the symbol scheduled for the further verification tone.

5. The apparatus according to claim 1, wherein the indication indicative of the estimation error is comprised in a message comprising an acknowledgement or a negative acknowledgement.

6. The apparatus according to claim 1, wherein the apparatus is further caused to:
   receive information indicating one or more time units for indicating the estimation error,
   wherein the indication indicative of the estimation error is transmitted during at least one of the one or more time units.

7. The apparatus according to claim 1, wherein the first reference signal transmission comprises a full demodulation reference signal; and
   wherein the one or more verification tones comprise a partial demodulation reference signal.

8. The apparatus according to claim 1, wherein the one or more verification tones comprise a lower density in fre- quency than the first reference signal transmission.

9. The apparatus according to claim 1, wherein the apparatus is further caused to:
   receive a message indicating a time window for predicting the future conditions of the radio channel,
   wherein the predicting is performed during the time window indicated by the received message.

10. The apparatus according to claim 1, wherein the apparatus is further caused to:
    if one or more reception assumptions change, transmit an indication for initiating the reference signal transmis- sion.

11. The apparatus according to claim 1, wherein the estimation error is determined based further on a set of modulated data constellation points.

12. The apparatus according to claim 1, wherein the estimation error is determined by estimating the radio chan- nel based on the one or more verification tones, and com- paring the estimated radio channel with at least a subset of the predicted future conditions of the radio channel.

13. The apparatus according to claim 1, wherein the radio channel is one of a physical downlink shared channel, a physical downlink control channel, a physical uplink shared channel, and a physical uplink control channel.

14. A method comprising:
    receiving a first reference signal transmission associated with a radio channel;
    predicting future conditions of the radio channel based at least partly on the first reference signal transmission;
    receiving one or more verification tones associated with the radio channel;
    determining, based at least partly on the one or more verification tones, an estimation error associated with the predicted future conditions of the radio channel;
    transmitting an indication indicative of the estimation error, if the estimation error exceeds a pre-defined threshold value; and receiving, in response to the indication indicative of the estimation error, a second reference signal transmission associated with the radio channel.

* * * * *